(12) United States Patent
Zong et al.

(10) Patent No.: US 9,977,190 B2
(45) Date of Patent: May 22, 2018

(54) WAVELENGTH SELECTIVE SWITCH

(71) Applicant: Huawei Technologies Co., Ltd., Shenzhen (CN)

(72) Inventors: Liangjia Zong, Shenzhen (CN); Han Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/636,941

(22) Filed: Jun. 29, 2017

(65) Prior Publication Data

US 2017/0299858 A1 Oct. 19, 2017

Related U.S. Application Data

(63) Continuation of application No. PCT/CN2014/095399, filed on Dec. 29, 2014.

(51) Int. Cl.
*G02B 6/293* (2006.01)
*G02B 26/08* (2006.01)
*G02B 6/35* (2006.01)

(52) U.S. Cl.
CPC ........... *G02B 6/293* (2013.01); *G02B 6/2931* (2013.01); *G02B 6/29395* (2013.01);
(Continued)

(58) Field of Classification Search
CPC .... G02B 6/293; G02B 6/3512; G02B 6/3526; G02B 6/3548; G02B 6/3556; G02B 6/3558; G02B 6/356
See application file for complete search history.

(56) References Cited

U.S. PATENT DOCUMENTS 6,927,891 B1   8/2005 Maheshwari
7,570,848 B2 * 8/2009 Okada ................. G02B 6/3512
                                                        385/18
(Continued)

FOREIGN PATENT DOCUMENTS

CN    102608710 A    7/2012
CN    103703405 A    4/2014
(Continued)

OTHER PUBLICATIONS

Machine Translation and Abstract of Chinese Publication No. CN102608710, Jul. 25, 2012, 8 pages.
(Continued)

*Primary Examiner* — Daniel Petkovsek
(74) *Attorney, Agent, or Firm* — Conley Rose, P.C.

(57) ABSTRACT

A wavelength selective switch (WSS) includes a liquid crystal on silicon (LCOS) panel and a fiber array with multiple ports. The two outermost ports of the multiple ports are a first port and a second port. An included angle between an intersecting line of the LCOS panel and a first plane in which the incident light entering the LCOS panel and emergent light exiting the LCOS panel are located, and incident light entering the LCOS panel is (90−θ) degrees, where a wavelength of the incident light is same as a wavelength of the emergent light, θ is less than 15 degrees, the first port and the included angle of (90−θ) degrees are located on a same side of the incident light, and the second port and the included angle of (90−θ) degrees are separately located on two sides of the incident light.

8 Claims, 9 Drawing Sheets

(52) U.S. Cl.
CPC ........... *G02B 6/3588* (2013.01); *G02B 26/08* (2013.01); *G02B 6/356* (2013.01); *G02B 6/3512* (2013.01); *G02B 6/3556* (2013.01)

(56) References Cited

U.S. PATENT DOCUMENTS

| | | | |
|---|---|---|---|
| 7,676,126 B2 | 3/2010 | McLaughlin et al. | |
| 8,233,794 B2* | 7/2012 | Colbourne | H04J 14/0206 |
| | | | 385/18 |
| 8,437,634 B2 | 5/2013 | Sakurai | |
| 8,873,905 B2* | 10/2014 | Wu | G02B 6/29313 |
| | | | 385/18 |
| 9,151,902 B2* | 10/2015 | Ohtsuka | G02F 1/31 |
| 9,201,286 B2* | 12/2015 | Mao | G02F 1/133528 |
| 9,306,699 B2* | 4/2016 | Sakurai | H04J 14/0212 |
| 9,454,002 B2* | 9/2016 | Matsumoto | G02B 6/3518 |
| 9,632,391 B2* | 4/2017 | Wagener | G02F 1/31 |
| 2009/0304328 A1* | 12/2009 | Presley | G02B 6/29311 |
| | | | 385/16 |
| 2014/0016079 A1 | 1/2014 | Sakurai | |
| 2014/0023316 A1 | 1/2014 | McLaughlin | |
| 2014/0205291 A1 | 7/2014 | Suzuki et al. | |
| 2014/0321796 A1 | 10/2014 | Ohtsuka et al. | |
| 2015/0185583 A1 | 7/2015 | Mao et al. | |

FOREIGN PATENT DOCUMENTS

| | | |
|---|---|---|
| WO | 2012123715 A1 | 9/2012 |
| WO | 2013038713 A1 | 3/2013 |

OTHER PUBLICATIONS

Foreign Communication From a Counterpart Application, PCT Application No. PCT/CN2014/095399, English Translation of International Search Report dated Sep. 18, 2015, 2 pages.
Foreign Communication From a Counterpart Application, PCT Application No. PCT/CN2014/095399, English Translation of Written Opinion dated Sep. 18, 2015, 5 pages.
Foreign Communication from a Counterpart Application, European Application No. 14909333.8, Extended European Search Report dated Jan. 4, 2018, 10 pages.

* cited by examiner

———— +1-order diffractive light

— — — — Diffractive light at another order

WAVELENGTH SELECTIVE SWITCH

CROSS-REFERENCE TO RELATED APPLICATIONS

This application is a continuation application of International Patent Application No. PCT/CN2014/095399, filed on Dec. 29, 2014, the disclosure of which is hereby incorporated herein by reference in its entirety.

TECHNICAL FIELD

The disclosure relates to the communications field, and more specifically, to a wavelength selective switch.

BACKGROUND

A continuous growth in network traffic drives a single-channel bit rate in a wavelength division multiplexing system to gradually develop from 10 gigabits per second (10 G) over ten years ago to 40 G and 100 G; and even to 4006 and 1 terabyte per second (IT) in the future. For a network system in which a single-channel rate is below 1000 a conventional spectrum interval of 50 gigahertz (GHz) can meet a requirement. However, when the bit rate reaches 400 G, 1 T, and even higher, a spectral width occupied by a signal will exceed 50 GHz. Therefore, on an existing network, when a signal with a rate of 400 G or above is borne, a high-rate signal needs to be divided into multiple low-rate signals. For example, a 400 G signal is divided into four 100 G signals, and each 100 G signal is borne by using a fixed frequency band of 50 GHz. This is feasible regarding network implementation, but inevitably causes a decrease in spectrum utilization in comparison with a continuous 400 G signal.

Therefore, to improve network spectrum resource utilization, a new network emerges—a "flexible bandwidth optical network". Bandwidth occupied by different signals is no longer limited to 50 GHz or an integer multiple of 50 GHz, but exists in a form of a flexible interval (Flexgrid). A change in a network structure inevitably requires adaptation of various optical components to the change. The optical components include a core switch component, that is, a wavelength selective switch (WSS). An early WSS is mainly an optical engine based on a micro-electro-mechanical system. However, there is a particular gap between various micromirrors in the micro-electro-mechanical system. Therefore, when multiple micromirrors are required for implementing a wide-spectrum filter, some grooves are generated between spectra. As a result, a spectral width of the filter cannot meet a "Flexgrid" requirement. In view of this, a new optical engine based on liquid crystal on silicon (LOS) is provided in the industry. The LCOS can implement a "Flexgrid" filter function, and therefore gradually becomes a mainstream technology.

An operating principle of the LCOS lies in that different voltages are loaded on different pixels of the LCOS. Because of a birefringent effect of liquid crystal, the different voltages correspond to different phase delays, thereby forming a structure similar to a blazed grating. A diffraction angle of the blazed grating depends on a grating period of the blazed grating. Therefore, a diffraction angle of incident light may be controlled merely by changing grating periods corresponding to different positions on the LCOS. This allows diffractive light to be output at different ports of the WSS, implementing a WSS function. Because there are millions of pixels on the LCOS and a gap between the pixels is very small, the Flexgrid filter function can be implemented very flexibly, and in addition, there is no spectrum gap.

However, because the operating principle of the LCOS is based on a diffraction effect, when diffractive light required by us is obtained, light at high diffraction orders is also generated due to a phase error. As shown in FIG. 1, FIG. 1 is a schematic structural diagram of a WSS. FIG. 1 is a schematic diagram for describing a crosstalk generation cause, and does not show a complete structure of the WSS. In FIG. 1, light entering an input port undergoes a series of processing (which may include deflection processing, demultiplexing and multiplexing processing, and the like) in the black box, and then is incident on an LCOS panel. A corresponding pixel on the LCOS diffracts required +1-order diffractive light to a corresponding output port according to a corresponding configuration. However, in this case, light at other diffraction orders may possibly enter other output ports. After entering a corresponding input port, diffractive light such as 0-order, −1-order, and +2-order diffractive light may possibly cause crosstalk on an optical link subsequently. For example, in FIG. 1, when the +1-order diffractive light needs to be output from output port 3, light at other diffraction orders may be possibly output from other ports as crosstalk light, causing intra-frequency crosstalk. However, once entering the corresponding output ports, this part of signals are difficult to eliminate, affecting system performance. Therefore, to improve the system performance of the LCOS-based WSS, a solution needs to be found to effectively suppress crosstalk signals.

SUMMARY

In view of this, embodiments of the disclosure provide a WSS.

An embodiment of the disclosure provides a WSS. The WSS includes a fiber array, an LCOS panel, and a lens component. The fiber array includes multiple ports that are arranged in a column. The multiple ports include an input port and multiple output ports. Two outermost ports of the multiple ports that are arranged in a column are a first port and a second port. An included angle between an intersecting line of the LCOS panel and a first plane and incident light entering the LCOS panel is equal to (90−θ) degrees. The first plane is a plane on which the incident light entering the LCOS panel and emergent light exiting the LCOS panel are located. A wavelength of the incident light is the same as a wavelength of the emergent light and θ is less than 15 degrees and meets the following condition:

$$\theta > \frac{\arctan(l_1/f)}{2} + \arctan(l_2/f)$$

$l_1$ is a distance between the input port and the first port and $l_2$ is a distance between the input port and the second port. The first port and the included angle of (90−θ) degrees are located on a same side of the incident light. The second port and the included angle of (90−θ) degrees are separately located on two sides of the incident light and f is a focal length of the lens component on the first plane.

An embodiment of the disclosure provides another WSS. The WSS includes a fiber array, an LCOS panel, and a lens component. The fiber array includes an input port and multiple output ports. The input port and the multiple output ports are located in a straight line. An included angle between the LCOS panel and a first plane is equal to (90−θ)

degrees. The first plane is a plane on which incident light entering the LCOS panel and +1-order diffractive light exiting the LCOS panel are located. A grating period $\Lambda_1$ that is of a blazed-grating-like structure on the LCOS panel and that is in a direction perpendicular to the straight line meets the following condition: $\Lambda_1=\lambda/2 \sin \theta$. A grating period $\Lambda_2$ that is of the blazed-grating-like structure on the LCOS panel and that is in a direction parallel to the straight line meets the following condition: $\Lambda_2=\lambda/(l/f)$, where $\lambda$ is a wavelength of the incident light. l is a distance between the input port and a destination output port and f is a focal length of the lens component on the first plane.

According to the WSS provided by the embodiments of the disclosure, without adding any additional component, other diffractive light different from +1-order diffractive light can be prevented from entering any input port or output port. This suppresses crosstalk with low costs.

BRIEF DESCRIPTION OF DRAWINGS

To describe the technical solutions in the embodiments of the disclosure more clearly, the following briefly describes the accompanying drawings required for describing the embodiments or the prior art. The accompanying drawings in the following description show merely some embodiments of the disclosure; and a person of ordinary skill in the art may still derive other drawings from these accompanying drawings without creative efforts.

DESCRIPTION OF EMBODIMENTS

The following clearly describes the technical solutions in the embodiments of the disclosure with reference to the accompanying drawings in the embodiments of the disclosure. The described embodiments are some but not all of the embodiments of the disclosure. All other embodiments obtained by a person of ordinary skill in the art based on the embodiments of the disclosure without creative efforts shall fall within the protection scope of the disclosure.

The disclosure provides an LCOS-based wavelength selective switch, which can effectively suppress crosstalk diffractive light. It should be noted that, the "connection" in the embodiments of the disclosure refers to a connection on an optical path. A person skilled in the art may understand that, specific optical components may not necessarily have an essential physical contact-type connection relationship, but spatial positions of these optical components and component features of these optical components enable these optical components to form a connection relationship on an optical path.

Figure 1:
FIG. 1 is a schematic principle diagram of generating crosstalk by a WSS in the other approaches.
Figure 2:
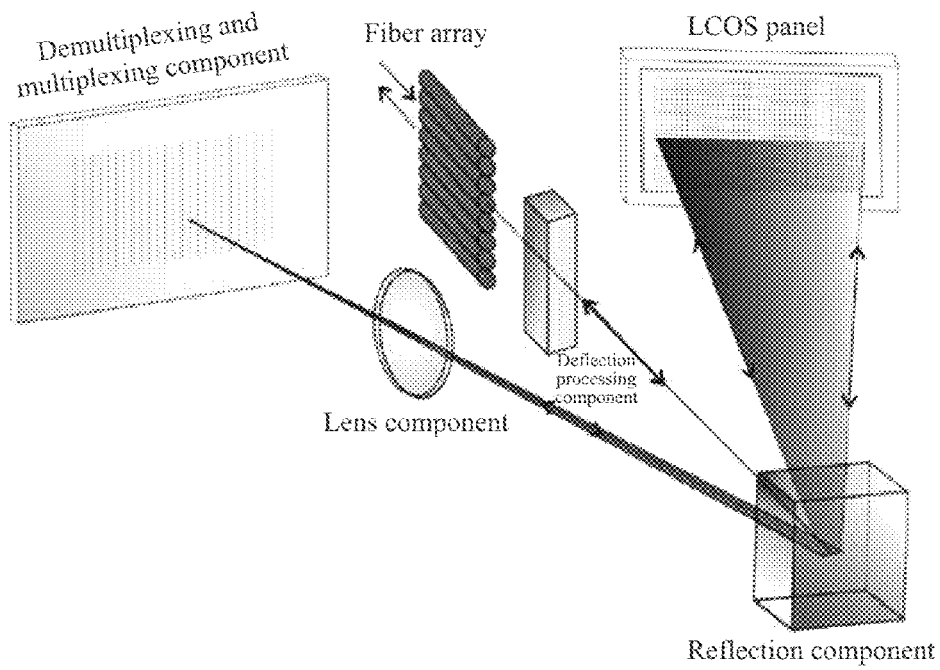
FIG. 2 is a schematic structural diagram of a WSS according to an embodiment of the disclosure.

As shown in FIG. 2, an LCOS-based WSS includes a fiber array configured for input and output, a deflection processing component configured for deflection processing, a reflection component configured to reflect light, a lens component configured to focus light, a demultiplexing and multiplexing component configured for demultiplexing and multiplexing, and an LCOS panel. Optionally, the WSS may further include a collimator array that is located after the fiber array and that is configured to collimate light. Optionally, the deflection processing component may include a beam deformation and polarization conversion component. Optionally, the lens component may be one lens or a combination of multiple lenses. Optionally, the demultiplexing and multiplexing component may be a grating.

FIG. 2 is merely a schematic diagram. In reality, light exiting the lens component is parallel light instead of scattered light. FIG. 2 schematically shows a corresponding light ray merely for describing expansion of various wavelengths in a horizontal direction. The LCOS-based WSS is a mature technology. Functions and spatial position relationships of various components in the figure (including components not shown in the figure) are well-known. The embodiments of the disclosure describe in detail only the LCOS panel that changes relative to a conventional WSS, and do not provide details about other known components and position relationships. In addition, the embodiments of the disclosure are also applicable to another LCOS-based WSS other than that in FIG. 2. Only a corresponding LCOS panel is correspondingly changed, and functions and position relationships of other components of the WSS may remain unchanged. In addition, a modified part of the LCOS panel in the embodiments of the disclosure is also applicable to a future potential WSS of another structure.

In FIG. 2, a straight line formed by the fiber array is referred to as a port direction (that is, a vertical direction in FIG. 2) in the embodiments of the disclosure. Correspondingly, in 2, a direction in which light with various wavelengths scatters after passing through the demultiplexing and multiplexing component is referred to as a wavelength direction (that is, a horizontal direction in FIG. 2) in the embodiments of the disclosure.

Multiple patents, such as patents with publication numbers of U.S. Pat. No. 8,437,634 B2, U.S. Patent Publication US20140023316 A1, PCT Publication WO2014027204 A1, Chinese Patent Application Publication CN203311035 U, and Chinese Patent Application Publication CN102879864 B, include a structure of a conventional WSS. Content of these patents is also combined in this patent.

An existing LCOS-based WSS can implement Flexpid filtering for spectrum signals. However, when LCOS is used as an optical engine to load a grating, multiple diffraction orders are generated. A prime light intensity order is a +1 order. Light at this order is output at a destination output port as emergent light. At the same time, light at other orders is output at other ports as crosstalk signals, causing infra-frequency crosstalk between WSS ports. A value of the crosstalk is generally above −25 decibel (dB). However, a system generally has a crosstalk requirement of less than −30 dB or even lower for a single WSS. Therefore, for the existing LCOS-based WSS, a crosstalk suppression method needs to be found.

Figure 3:
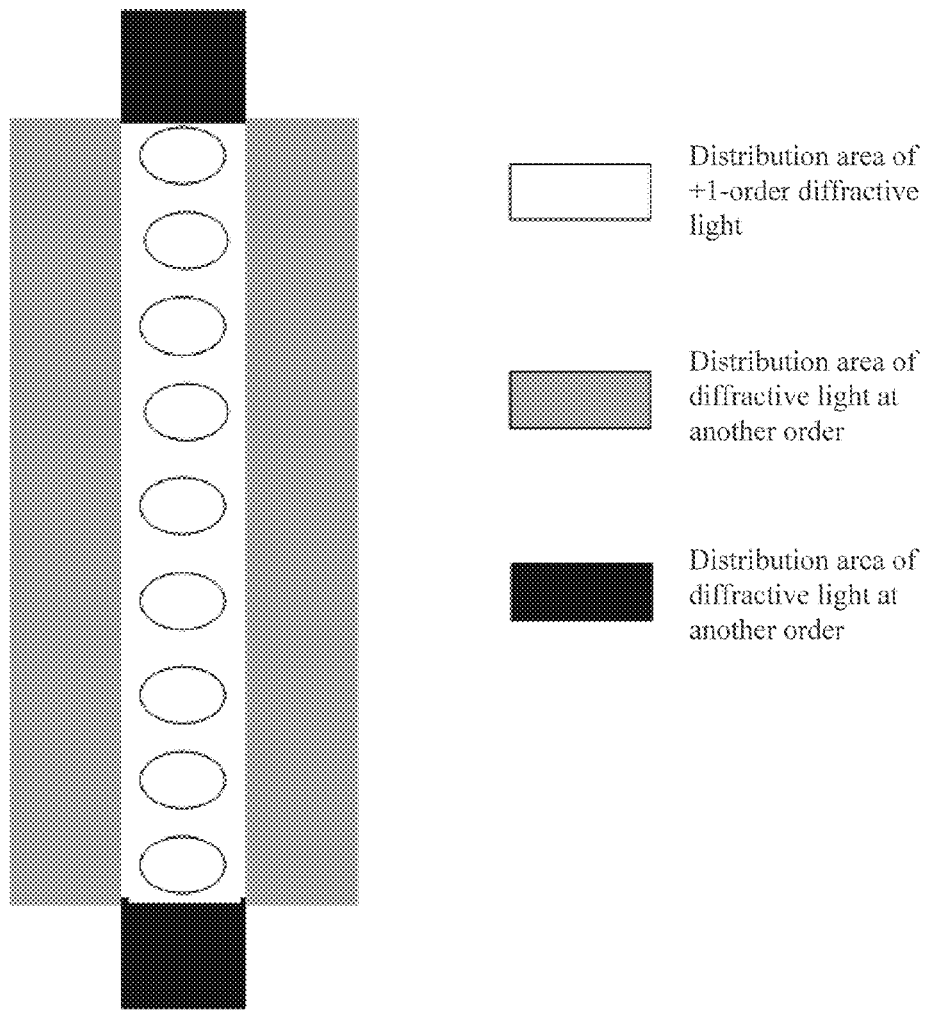
FIG. 3 is a schematic diagram of an exit area of various orders of diffractive light according to an embodiment of the disclosure.

An embodiment of the disclosure provides a solution of effectively suppressing port crosstalk. As shown in FIG. 3, an output port plane of a WSS is divided into a +1-order signal light area and areas of crosstalk light at other orders. A white area in FIG. 3 is the +1-order diffractive light area. A circle in the figure represents an input or output port in a fiber array. FIG. 3, different from the white area, a black area and a gray area are the distribution areas of the diffractive light at other orders. Theoretically, crosstalk can be effectively suppressed provided that +1-order diffractive light is output from a corresponding output port in the white area in the figure and the diffractive light at other orders is correspondingly output from the peripheral black or gray area other than the white area.

Figure 4:
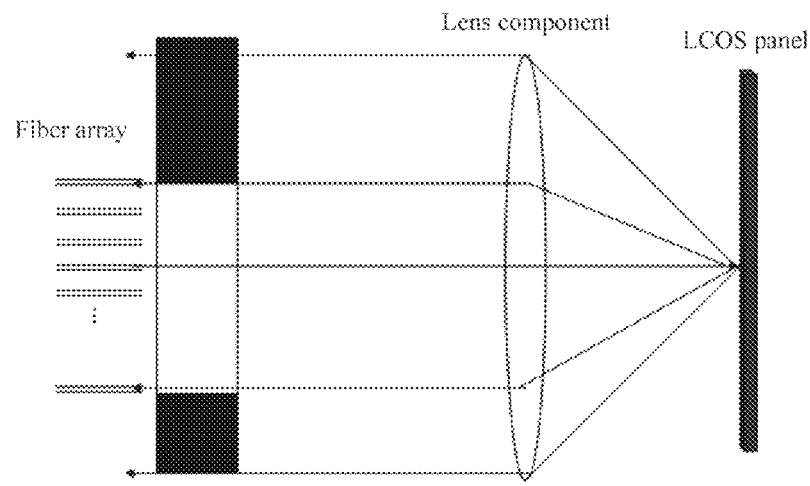
FIG. 4 is a schematic diagram of a solution in which an LCOS panel is deflected by using a wavelength direction as an axis according to an embodiment of the disclosure.

In an implementation, as shown in FIG. 4, only the fiber array, a lens component, and an LCOS panel are schematically shown in FIG. 4. White and black areas corresponding to the white and black areas in FIG. 3 are used only for description, and do not represent any component. FIG. 4 is equivalent to a schematic front view of FIG. 2. In FIG. 4, signal light is input through an input port of the fiber array. After switching is performed in the WSS, +1-order diffractive light of the signal light is transmitted to a destination output port from the white area in FIG. 4. Diffractive light at other orders is transmitted to the black area, that is, the diffractive light at other orders does not enter any output port. Therefore, no crosstalk is caused. In this implementation of the disclosure, the LCOS panel is deflected by a small angle by using a wavelength direction (the horizontal direction in FIG. 2) as an axis.

Figure 5:
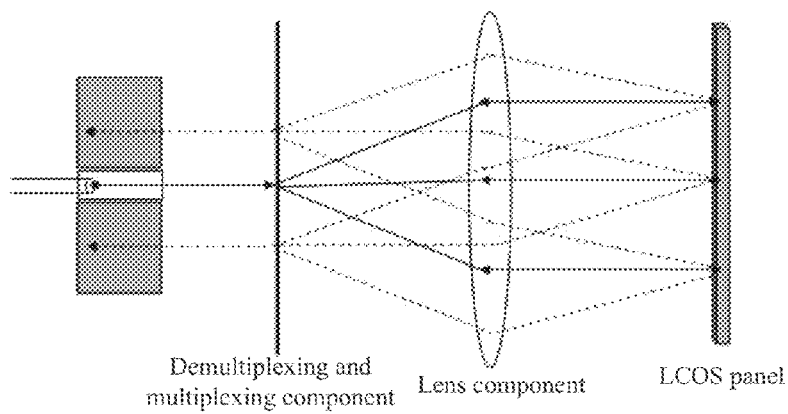
FIG. 5 is a schematic diagram of a solution in which an LCOS panel is deflected by using a port direction as an axis according to an embodiment of the disclosure.

In another implementation, as shown in FIG. 5, only the fiber array, a demultiplexing and multiplexing component, a lens component, and an LCOS panel are schematically shown in FIG. 5. White and gray areas corresponding to the white and gray areas in FIG. 3 are used only for description, and do not represent any component. FIG. 5 is equivalent to a schematic top view of FIG. 2. It can be learned from FIG. 5 that, after light output from the fiber array undergoes optical switching in the WSS, +1-order diffractive light returns on a vertical plane and is transmitted to a corresponding destination output port. Diffractive light at other orders is transmitted to the gray area, that is, the diffractive light at other orders does not enter any output port, thereby effectively suppressing crosstalk. Three solid return lines in the figure represent three beams of +1-order diffractive light with different wavelengths. In this implementation of the disclosure, the LCOS panel is deflected by a small angle by using a port direction (the vertical direction in FIG. 2) as an axis, and a blazed-grating-like structure on the LCOS panel is a tilt structure.

Specifically, corresponding to the implementation in FIG. 4, an embodiment of the disclosure provides a wavelength selective switch WSS. The WSS includes a fiber array, a liquid crystal on silicon LCOS panel, and a lens component. The fiber array includes multiple ports that are arranged in a column. The multiple ports include an input port and multiple output ports. Two outermost ports of the multiple ports that are arranged in a column are a first port and a second port. An included angle between an intersecting line of the LCOS panel and a first plane and incident light entering the LCOS panel is equal to (90−θ) degrees. The first plane is a plane on which the incident light entering the LCOS panel and emergent light exiting the LCOS panel are located. A wavelength of the incident light is the same as a wavelength of the emergent light and θ is less than 15 degrees and meets the following condition:

$$\theta > \frac{\arctan(l_1/f)}{2} + \arctan(l_2/f)$$

$l_1$ is a distance between the input port and the first port. $l_2$ is a distance between the input port and the second port. The first port and the included angle of (90−θ) degrees are located on a same side of the incident light. The second port and the included angle of (90−θ) degrees are separately located on two sides of the incident light and f is a focal length of the lens component on the first plane. It should be noted that focal lengths of the lens component may be the same or may be different in different directions. In all implementations of the disclosure, correspondingly, refers to a focal length of the lens component in a port direction, that is, the focal length on the first plane.

Specifically, a grating period Λ of a blazed-grating-like structure on the LCOS panel meets the following condition: Λ=λ/(sin θ+sin $B_1$). $B_1$ is a diffraction angle of +1-order diffractive light in the emergent light, and λ is the wavelength of the incident light and the emergent light. When a destination output port of the +1-order diffractive light and the included angle of (90−θ) degrees are located on a same side of the incident light, $B_1$ is equal to θ+arctan($l_3$/f). When a destination output port of the +1-order diffractive light and the included angle of (90−θ) degrees are separately located on two sides of the incident light, $B_1$ is equal to θ−arctan($l_3$/f). $l_3$ is a distance between the destination output port and the input port.

Optionally, θ is less than 5 degrees.

The blazed-grating-like structure on the LCOS panel is configured to adjust a diffraction angle of diffractive light at various orders in the emergent light, and the first plane is parallel to a straight line in which the multiple ports that are arranged in a column are located.

The WSS further includes a deflection processing component, a reflection component, and a demultiplexing and multiplexing component.

Optionally, in this embodiment, the multiple ports may include one input port and multiple output ports, or may include multiple input ports and multiple output ports. In the following embodiment, one input port and multiple output ports are used as an example. For a case of multiple input ports and multiple output ports, description about each input port is the same as that about the input port in the case of one input port and multiple output ports. The input port may be located in the middle of the multiple ports that are arranged in a column, or may be located at either end of the multiple ports that are arranged in a column.

Figure 6:
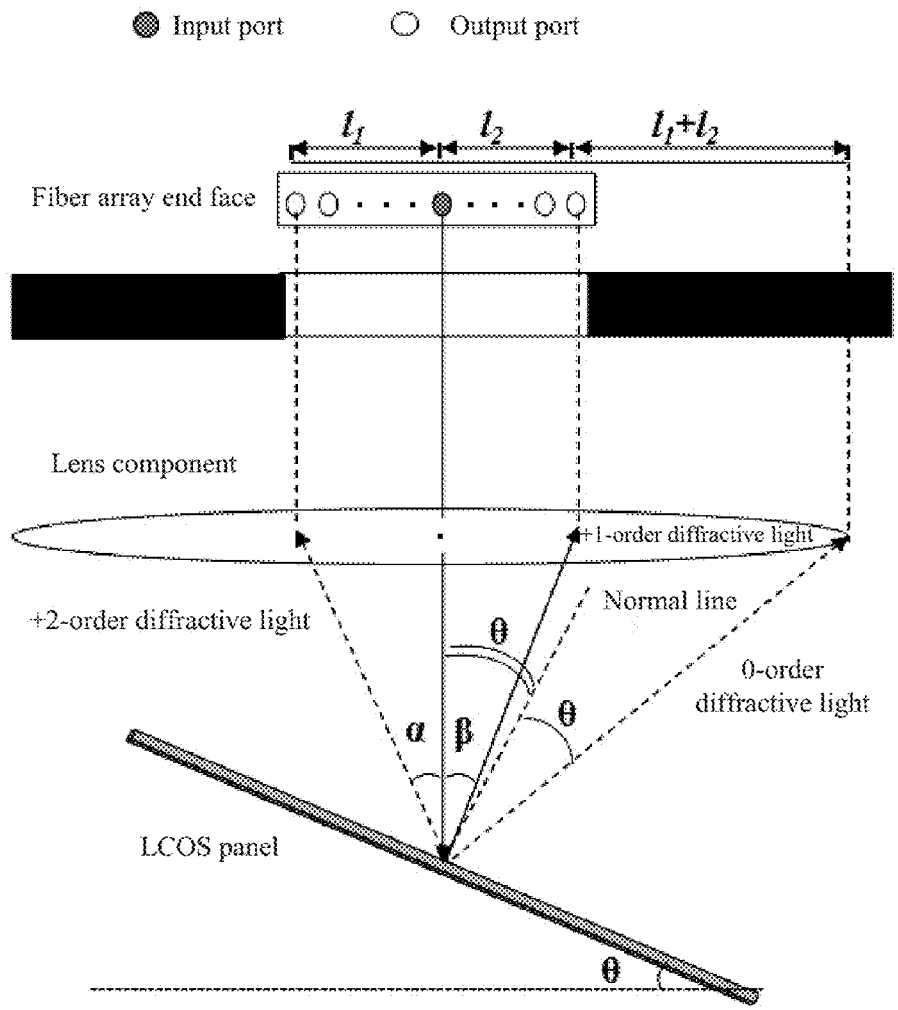
FIG. 6 is a schematic diagram of a critical deflection state in a solution in which an LCOS panel is deflected by using a wavelength direction as an axis according to an embodiment of the disclosure.

To clearly describe the specific implementation principle of the embodiment in FIG. 4, an embodiment of the disclosure provides FIG. 6. A conventional LCOS panel is generally perpendicular to incident light. However, in FIG. 6, an included angle of (90−θ) degrees is formed between an LCOS panel and incident light. To enable +1-order diffractive light to enter a corresponding destination output port of a fiber array and 0-order diffractive light and +2-order diffractive light to be located outside a white area, θ is greater than a specific value. This embodiment of the disclosure provides a θ value in a critical condition. Provided that a deflection angle of the LCOS panel is greater than the θ value, it can be ensured that the +1-order diffractive light enters the corresponding destination output port of the fiber array and that the 0-order diffractive light and the +2-order diffractive light are located outside the white area.

FIG. 6 shows a schematic diagram of a corresponding critical state. When the included angle of (90−θ) degrees is formed between the LCOS panel and the incident light, differences between diffraction angles of diffractive light at adjacent orders are equal in a case of a small diffraction angle. In this way, an included angle α+β between the +2-order diffractive light and the +1-order diffractive light should be equal to an included angle 2θ−β between the +1-order diffractive light and the 0-order diffractive light. That is, α+β=2θ−β. Therefore, θ=α/2+β. In addition, α=arctan($l_1$/f), and β=arctan($l_2$/f). Therefore, the critical θ value is as follows.

$$\theta = \frac{\arctan(l_1/f)}{2} + \arctan(l_2/f)$$

$l_1$ is a distance between the input port and an outermost output port on a left side in FIG. 6; $l_2$ is a distance between the input port and an outermost output port on a right side; and f is a focal length of the lens component on the first plane.

In this critical state, the 0-order diffractive light is obviously not transmitted to the output port, and the +2-order diffractive light is transmitted to the outermost port on the left side. Therefore, provided that the corresponding θ value is greater than this critical value, the +2-order diffractive light is transmitted to a black area in FIG. 6, and does not enter any port, thereby effectively suppressing crosstalk.

In a range in which the θ value is greater than this critical value, a small θ value should be selected as possible. Generally the θ value is not greater than 15 degrees. Preferably, the θ value is not greater than 10 degrees, or not greater than 5 degrees, or not greater than 3 degrees.

Figure 7:
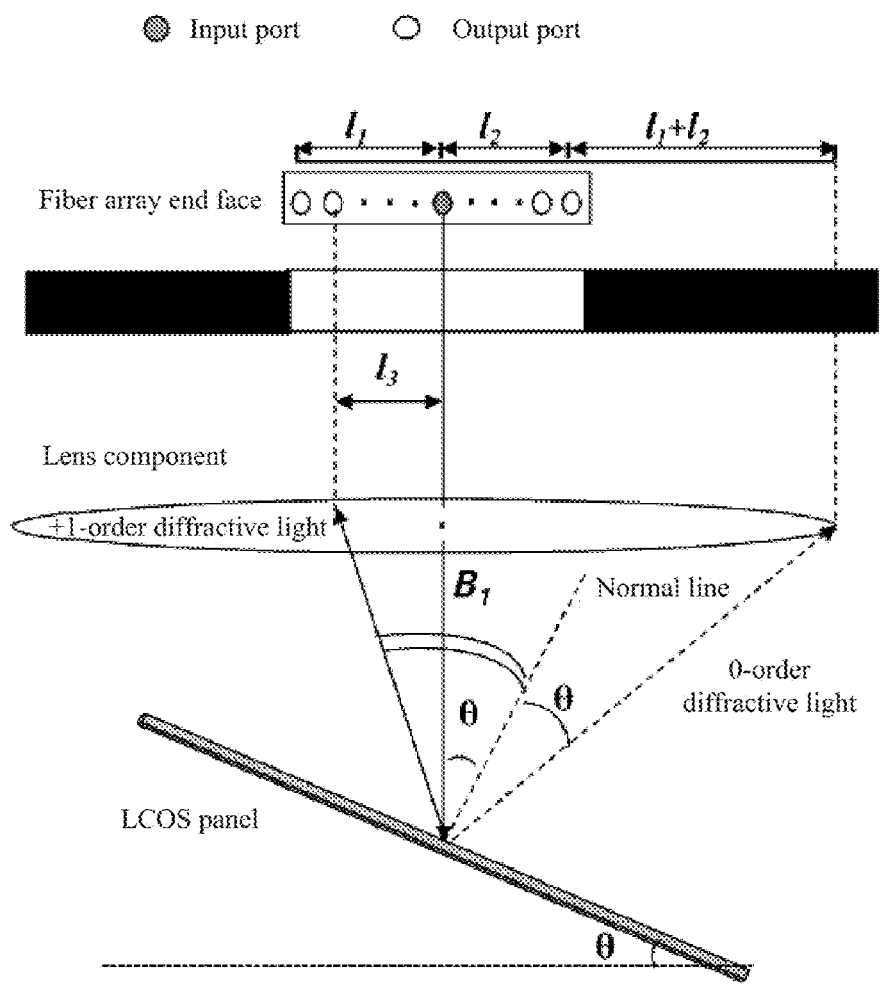
FIG. 7 is a schematic diagram of a diffraction angle of +1-order diffractive light in a solution in which an LCOS panel is deflected by using a wavelength direction as an axis according to an embodiment of the disclosure.
Figure 8:
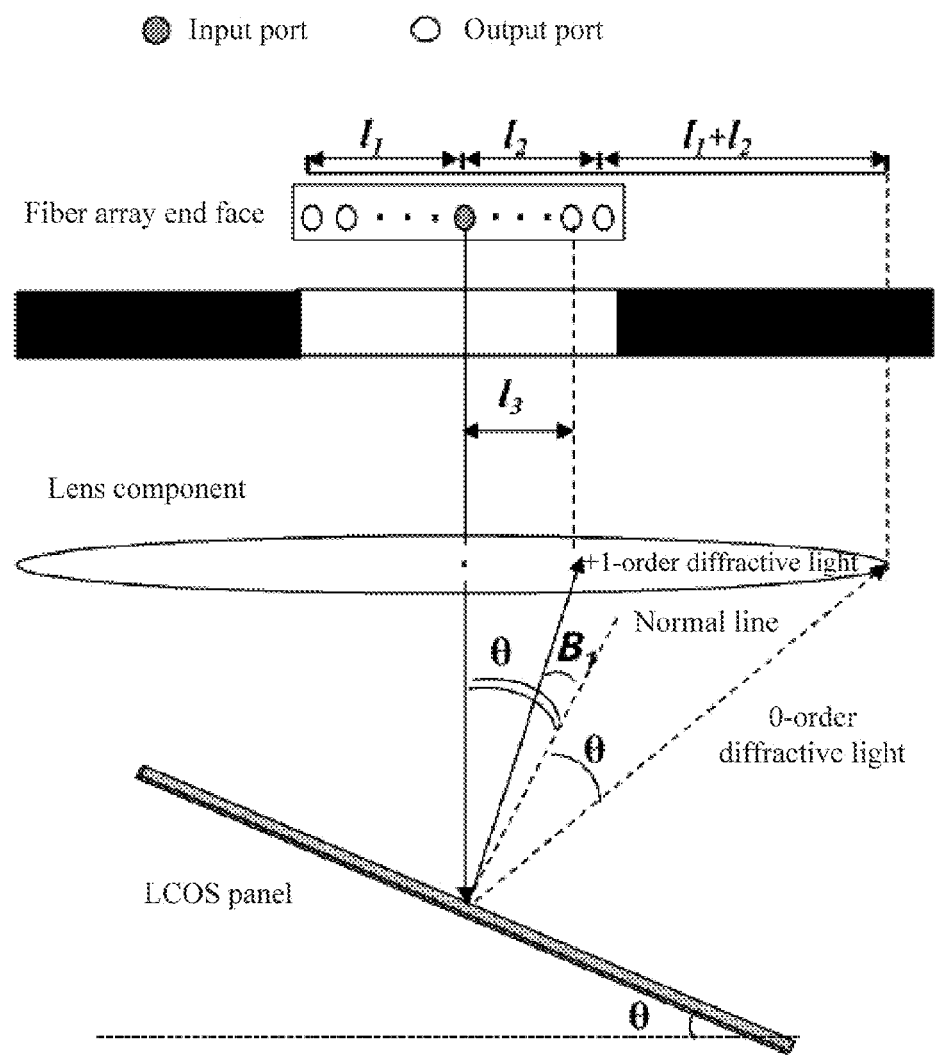
FIG. 8 is a schematic diagram of a diffraction angle of +1-order diffractive light in a solution in which an LCOS panel is deflected by using a wavelength direction as an axis according to an embodiment of the disclosure.

In a WSS structure in this embodiment of the disclosure, a corresponding grating period Λ of a blazed-grating-like structure on the LCOS panel may be determined by using a grating equation Λ(sin θ+sin $B_m$)=mλ when light is transmitted to different ports. In the grating equation, θ is an incidence angle of the incident light, $B_m$ is a diffraction angle of diffractive light at an $m^{th}$ order, and λ is a corresponding optical wavelength. Because a required optical signal is the +1-order diffractive light, the foregoing grating equation is converted to Λ(sin θ+sin $B_1$)=λ. Therefore, Λ=λ/(sin θ+sin $B_1$). As shown in FIGS. 7 and 8, if a destination output port that the optical signal is transmitted to and the included angle of (90−θ) degrees are located on a same side of the incident light, $B_1$ is equal to θ+arctan($l_3$/f). When a destination output port of the +1-order diffractive light and the included angle of (90−θ) degrees are separately located on two sides of the incident light, $B_1$ is equal to θ−arctan($l_3$/f) and $l_3$ is a distance between the destination output port and the input port.

In the following, a 1×4 WSS is used as an example to describe how to suppress crosstalk of light at a high diffraction order.

Figure 9:
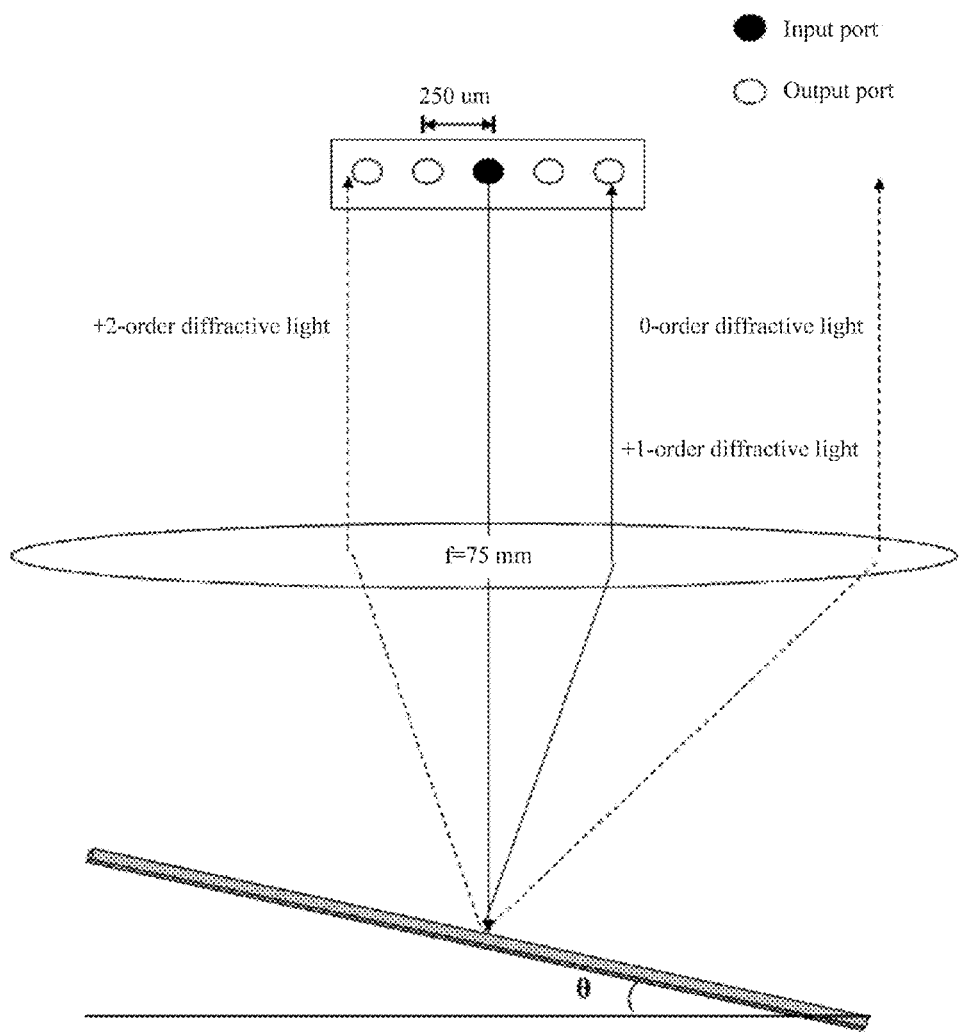
FIG. 9 is a schematic diagram of a specific case of a diffraction angle of +1-order diffractive light in a solution in which an LCOS panel is deflected by using a wavelength direction as an axis according to an embodiment of the disclosure.

As shown in FIG. 9, the WSS includes 1×4 ports in this embodiment. Two ports are disposed on each side of an input port. A distance between adjacent ports is 250 micrometer (um). A focal length of a lens is 75 millimeter (mm). Herein, a manner of rotating LCOS clockwise is used.

In this implementation, $l_1$=$l_2$=500 um, and f=75 mm. According to $$\theta = \frac{\arctan(l_1/f)}{2} + \arctan(l_2/f),$$

it can be learnt that a value of θ in a critical state is 0.573 degree (°). Then, according to a value range of θ, a specific θ value may be determined. Herein, θ may be set to 0.6°, and the LCOS panel is rotated to a corresponding angle.

Then, according to port positions and the θ value, a wavelength value is 1.55 um. By using a grating diffraction equation Λ=λ/(sin θ+sin $B_1$), grating periods of a blazed-grating-like structure on the LCOS panel that are corresponding to four output ports disposed from left to right are: 56.2 um, 63.9 um, 88 um, and 109.6 um.

Grating periods of the blazed-grating-like structure on the LCOS panel that correspond to different wavelengths and different output ports may be obtained by using different wavelength values. A WSS function can be implemented by importing a correspondence among an output port, a wavelength, and a grating period into an LCOS chip.

A person skilled in the art clearly knows that, for a given WSS structure, incident light, input from a specific input port, with a specific wavelength is incident on a fixed pixel (pixel) on an LCOS panel. The pixel or multiple pixels are a set of a series of liquid crystal. Because of a birefringent effect of the liquid crystal, a blazed-grating-like structure is formed under an external voltage. A grating period of the blazed-grating-like structure can be adjusted by adjusting a corresponding external voltage. It may be known from the foregoing grating diffraction equation Λ=2/(sin θ+sin $B_1$) that, once the grating period Λ, a wavelength λ of the incident light, and an incidence angle θ are determined, a diffraction angle $B_1$ of a corresponding +1-order diffraction light, that is, required signal light, is determined. Emergent diffractive light returns, for output, to a fiber array by using a lens component. Relative to the incident light, the +1-order diffractive light has corresponding displacement in a straight line in which the fiber array is located. A value of the displacement can be adjusted by adjusting the corresponding external voltage. When the external voltage is appropriate, the diffractive light may be output from a corresponding destination output port.

According to the WSS provided by this embodiment of the disclosure, without adding any additional component, other diffractive light different from +1-order diffractive light can be prevented from entering any input port or output port, provided that an LCOS panel is correspondingly deflected. This suppresses crosstalk with low costs.

Corresponding to FIG. 5, an embodiment of the disclosure provides another LCOS-based. WSS. The WSS includes a fiber array, an LCOS panel, and a lens component. The fiber array includes an input port and multiple output ports. The input port and the multiple output ports are located in a straight line. An included angle between the LCOS panel and a first plane is equal to (90−θ) degrees. The first plane is a plane on which incident light entering the LCOS panel and +1-order diffractive light exiting the LCOS panel are located. A grating period $\Lambda_1$ that is of a blazed-grating-like structure on the LCOS panel and that is in a direction perpendicular to the straight line meets the following condition: $\Lambda_1=\lambda/2 \sin \theta$. A grating period $\Lambda_1$ that is of the blazed-grating-like structure on the LCOS panel and that is in a direction parallel to the straight line meets the following condition: $\Lambda_2=\lambda/(l/f)$. $\lambda$ is a wavelength of the incident light. l is a distance between the input port and a destination output port. f is a focal length of the lens component on the first plane.

Optionally, $\theta$ is less than 5 degrees. For example, $\theta$ may be 1 degree, 1.5 degrees, 2 degrees, 3 degrees, or 4 degrees.

Optionally, the blazed-grating-like structure on the LCOS panel is configured to adjust a diffraction angle of diffractive light at various orders in emergent light, and the first plane is parallel to the straight line.

Optionally, the WSS further includes a deflection processing component, a reflection component, and a demultiplexing and multiplexing component.

In this implementation of the disclosure, the LCOS panel is deflected by a small angle by using a port direction (the vertical direction in FIG. 2) as an axis, and the blazed-grating-like structure on the LCOS panel is a tilt structure.

Figure 10:
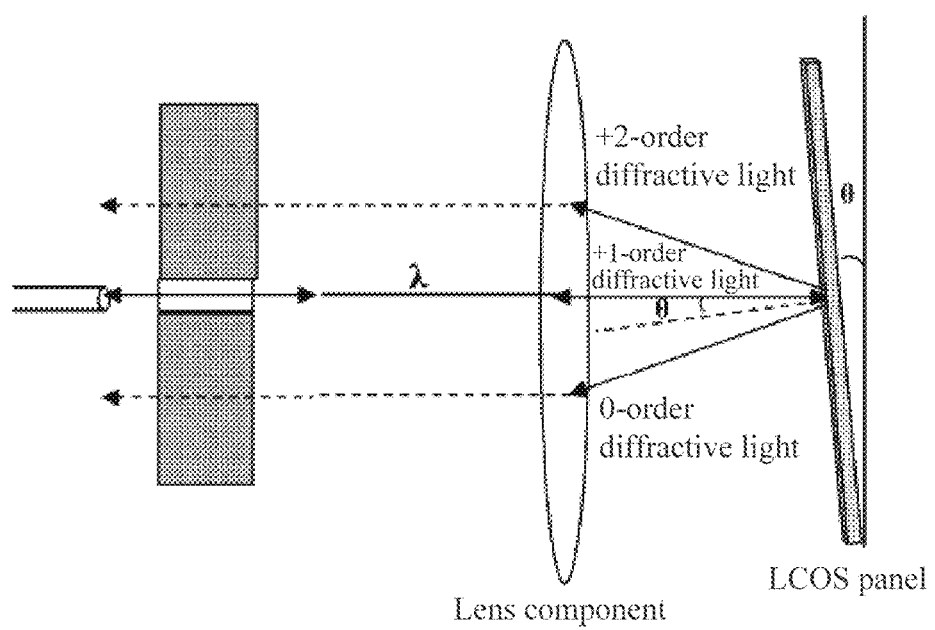
FIG. 10 is a schematic principle diagram of a solution in which an LCOS panel is deflected by using a port direction as an axis according to an embodiment of the disclosure.

As shown in FIG. 10, FIG. 10 is corresponding to FIG. 5. A white box and a gray box behind the fiber array in FIG. 10 are corresponding to the white box and the gray box in FIG. 3, do not represent any component, and are used only to describe an exit scope of the diffractive light. In FIG. 10, the LCOS panel is rotated by $\theta$ by using the port direction (the vertical direction in FIG. 2) as an axis. If the LCOS panel is only rotated and no other processing is performed, all diffractive light should exit along a direction of 0-order diffractive light in FIG. 10. In this embodiment of the disclosure, to enable the +1-order diffractive light to return to a corresponding destination output port along the plane on which the incident light is located, in addition to rotating the LCOS panel by $\theta$, a blazed-grating-like structure configured to adjust displacement of the +1-order diffractive light in a wavelength direction is further configured. At the same time, a blazed-grating-like structure configured to adjust displacement of the +1-order diffractive light in the port direction is further configured, so as to adapt to a destination output port through which the +1-order diffractive light exits. A comprehensive effect of the two blazed-grating-like structures is that, an actual blazed-grating-like structure on the LCOS panel tilts.

Figure 11:
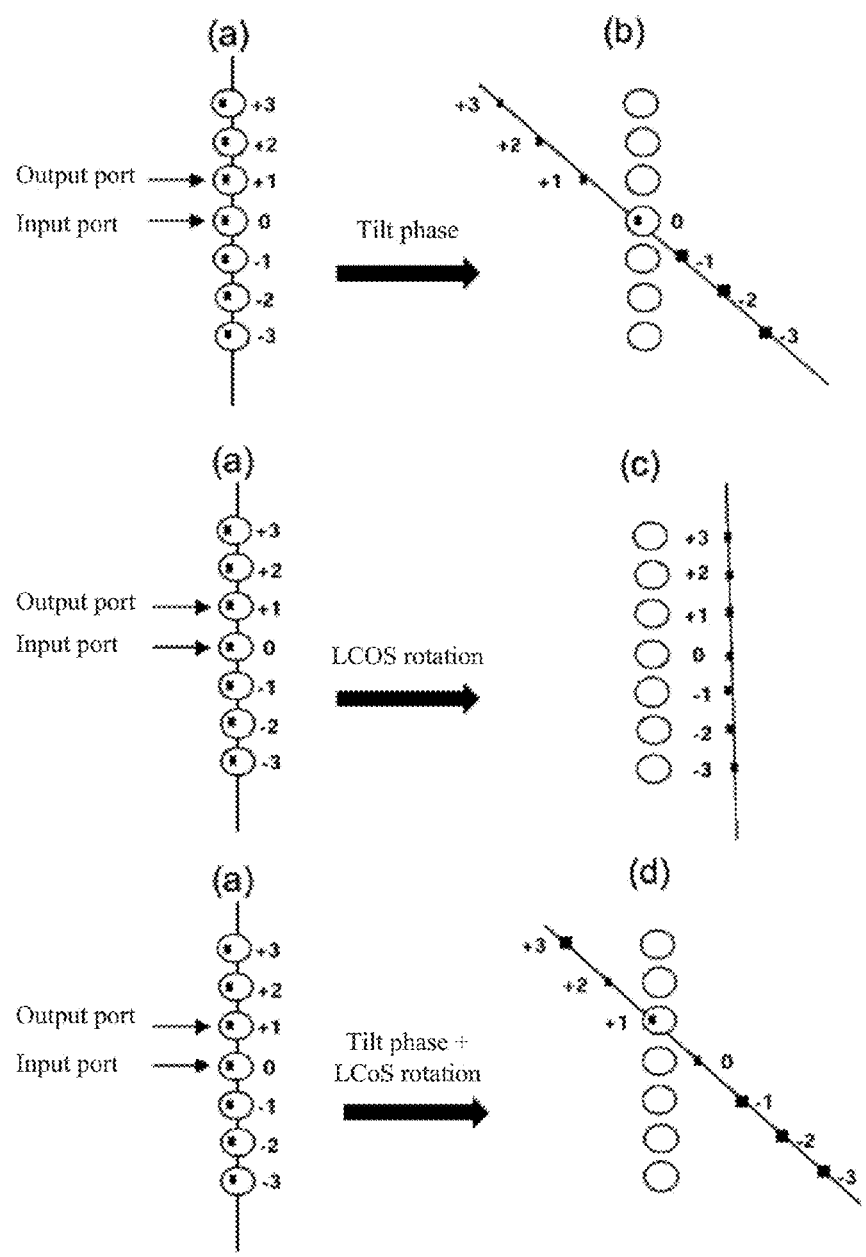
FIG. 11 is another schematic principle diagram of a solution in which an LCOS panel is deflected by using a port direction as an axis according to an embodiment of the disclosure.

The solution and principle of this embodiment of the disclosure are described in detail below with reference to FIG. 11. In FIG. 11, black points indicate diffractive light at various orders, circles indicate ports of the fiber array, and numbers indicate the orders of the diffractive light. As shown in FIG. 11, a part (a) is used to indicate a situation of various orders of diffractive light returned from ports of a fiber array in a conventional WSS. An LCOS panel in the part (a) is not deflected in any manner, and no blazed-grating-like structure configured to adjust displacement in a wavelength direction is configured on the LCOS. If a blazed-grating-like structure of the LCOS is deflected, or a tilt blazed-grating-like structure is configured but the LCOS is not deflected, various orders of emergent diffractive light shown in a part (h) in FIG. 11 may be obtained from the ports of the fiber array. If the LCOS panel is deflected but the blazed-grating-like structure on the conventional LCOS panel is not changed, various orders of emergent diffractive light shown in a part (c) in FIG. 11 may be obtained from the ports of the fiber array. In this embodiment of the disclosure, the LCOS panel is rotated, and the blazed-grating-like structure on the LCOS panel is changed correspondingly, so that various orders of emergent diffractive light shown in a part (d) in FIG. 11 may be obtained from the ports of the fiber array.

It can be seen from the part (d) in FIG. 11 that, +1-order diffractive light is output from a corresponding port, and other orders of diffractive light bypass ports of the fiber array, thereby effectively suppressing crosstalk. Further, a grating period of the blazed-grating-like structure in the port direction on the LCOS panel is adjusted, and therefore, displacement of corresponding +1-order diffractive light in the port direction may be adjusted, so that the +1-order diffractive light is output from a corresponding output port.

Specifically, an included angle between the LCOS panel and a first plane is equal to $(90-\theta)$ degrees. The first plane is a plane on which incident light entering the LCOS panel and +1-order diffractive light exiting the LCOS panel are located. That is, the LCOS panel in FIG. 10 is deflected by an angle of $\theta$. In this case, to enable the +1-order diffractive light to exit from the first plane, a diffraction angle in the wavelength direction should be $\theta$. Therefore, according to a grating equation $\Lambda_1(\sin \theta+\sin B_m)=m\lambda$, the grating period $\Lambda_1$ that is of the blazed-grating-like structure on the LCOS panel and that is in the direction perpendicular to the straight line meets the following condition: $\Lambda_1=\lambda/2 \sin \theta$. Herein, m in the grating equation is equal to 1, and the diffraction angle of the +1-order diffractive light is $B_m=B_1=\theta$. In this way, it can be ensured that the +1-order diffractive light is output from a direction of a straight line in which multiple ports of the fiber array are located. Further, to adjust the displacement of the +1-order diffractive light in the port direction, according to a grating equation $\Lambda_2(\sin \varphi+\sin B_m)=m\lambda$, the grating period $\Lambda_2$ that is of the blazed-grating-like structure on the LCOS panel and that is in the direction parallel to the straight line meets the following condition: $\Lambda_2=\lambda/(l/f)$. Herein, $\varphi$ is an incidence angle of the incident light in the port direction, a value of $\varphi$ is equal to 0, and m is equal to 1. In addition, because the distance l between the destination output port and the input port is far less than f, $\sin B_m=\sin B_1=\tan B_1=l/f$.

For a detailed method for configuring the grating period of the blazed-grating-like structure on the LCOS panel, reference may be made to the foregoing descriptions, and details are not described herein.

According to the WSS provided by this embodiment of the disclosure, without adding any additional component, other diffractive light different from +1-order diffractive light can be prevented from entering any input port or output port, provided that an LCOS panel is correspondingly deflected and a corresponding blazed-grating-like structure is configured. This suppresses crosstalk with low costs.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:
1. A wavelength selective switch (WSS), comprising:
   a liquid crystal on silicon (LCOS) panel;
   a fiber array, wherein the fiber array comprises multiple ports that are arranged in a column, wherein the multiple ports comprise an input port and multiple output ports, and wherein two outermost ports of the multiple ports that are arranged in a column are a first port and a second port;

a deflection processing component optically coupled to the fiber array;

a reflection component optically coupled to the deflection processing component;

a lens component optically coupled to the reflection component;

a demultiplexing component; and a multiplexing component, wherein an included angle between an intersecting line of the LCOS panel and a first plane and incident light entering the LCOS panel is (90−θ) degrees, wherein the first plane is a plane on which the incident light entering the LCOS panel and emergent light exiting the LCOS panel are located, wherein a wavelength of the incident light is same as a wavelength of the emergent light, wherein θ is less than 15 degrees and is $$\theta > \frac{\arctan(l_1/f)}{2} + \arctan(l_2/f),$$

wherein $l_1$ is a distance between the input port and the first port, $l_2$ is a distance between the input port and the second port, wherein the first port and the included angle of (90−θ) degrees is located on a same side of the incident light, wherein the second port and the included angle of (90−θ) degrees are separately located on two sides of the incident light, and wherein f is a focal length of the lens component on the first plane.

2. The WSS according to claim 1, wherein a grating period Λ of a blazed grating on the LCOS panel meets a condition of Λ=λ/(sin θ+sin $B_1$), wherein $B_1$ is a diffraction angle of a +1-order diffractive light in the emergent light and λ is the wavelength of the incident light and the emergent light, wherein $B_1$ is equal to θ+arctan($l_3$/f) when a destination output port of the +1-order diffractive light and the included angle of (90−θ) degrees are located on a same side of the incident light, and wherein $l_3$ is a distance between the destination output port and the input port.

3. The WSS according to claim 1, wherein θ is less than 5 degrees.

4. The WSS according to claim 1, wherein a blazed grating on the LCOS panel is configured to adjust a diffraction angle of diffractive light at various orders in the emergent light, and wherein the first plane is parallel to a straight line in which the multiple ports that are arranged in a column are located.

5. The WSS according to claim 1, wherein a grating period Λ of a blazed grating on the LCOS panel meets Λ=λ/(sin θ+sin $B_1$), wherein $B_1$ is a diffraction angle of a +1-order diffractive light in the emergent light and λ is the wavelength of the incident light and the emergent light, $B_1$ is equal to θ−arctan($l_3$/f) when a destination output port of the +1-order diffractive light and the included angle of (90−θ) degrees is separately located on two sides of the incident light, and wherein $l_3$ is a distance between the destination output port and the input port.

6. A wavelength selective switch (WSS), comprising:

a liquid crystal on silicon (LCOS) panel;

a lens component; and a fiber array, wherein the fiber array comprises an input port and multiple output ports, wherein the input port and the multiple output ports are located in a straight line;

a deflection processing component optically coupled to the fiber array;

a reflection component optically coupled to the deflection processing component;

a demultiplexing component; and a multiplexing component, wherein an included angle between the LCOS panel and a first plane is equal to (90−θ) degrees, wherein the first plane is a plane on which incident light entering the LCOS panel and a +1-order diffractive light exiting the LCOS panel are located, wherein a first grating period $Λ_1$ of a blazed grating on the LCOS panel that is in a direction perpendicular to the straight line meets a condition of $Λ_1$=λ/2 sin θ, wherein a second grating period $Λ_2$ of the blazed grating on the LCOS panel that is in a direction parallel to the straight line meets a condition of $Λ_2$=λ/(l/f), and wherein λ is a wavelength of the incident light, l is a distance between the input port and a destination output port, and f is a focal length of the lens component on the first plane.

7. The WSS according to claim 6, wherein θ is less than 5 degrees.

8. The WSS according to claim 6, wherein the blazed grating on the LCOS panel is configured to adjust a diffraction angle of diffractive light at various orders in emergent light, and wherein the first plane is parallel to the straight line.

* * * * *

UNITED STATES PATENT AND TRADEMARK OFFICE
CERTIFICATE OF CORRECTION

PATENT NO.         : 9,977,190 B2
APPLICATION NO.    : 15/636941
DATED              : May 22, 2018
INVENTOR(S)        : Liangjia Zong and Han Zhao Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Tenth Day of July, 2018

Andrei Iancu
*Director of the United States Patent and Trademark Office*